(12) United States Patent
Hara

(10) Patent No.: US 9,014,437 B2
(45) Date of Patent: Apr. 21, 2015

(54) RIDGE DIRECTION EXTRACTION DEVICE, RIDGE DIRECTION EXTRACTION METHOD, AND RIDGE DIRECTION EXTRACTION PROGRAM

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/240,659

(22) PCT Filed: Aug. 7, 2012

(86) PCT No.: PCT/JP2012/070090
§ 371 (c)(1),
(2), (4) Date: Feb. 24, 2014

(87) PCT Pub. No.: WO2013/027572
PCT Pub. Date: Feb. 28, 2013

(65) Prior Publication Data
US 2014/0205162 A1    Jul. 24, 2014

(30) Foreign Application Priority Data
Aug. 23, 2011  (JP) .................................. 2011-181080

(51) Int. Cl.
*G06K 9/00* (2006.01)
(52) U.S. Cl.
CPC ..................................... *G06K 9/0008* (2013.01)
(58) Field of Classification Search
None
See application file for complete search history.

(56) References Cited

U.S. PATENT DOCUMENTS

| | | | |
|---|---|---|---|
| 5,608,811 A | 3/1997 | Kamei | |
| 6,324,297 B1 * | 11/2001 | Uchida | 382/125 |
| 2007/0047784 A1 | 3/2007 | Hara | |
| 2009/0232397 A1 | 9/2009 | Hara | |
| 2011/0200237 A1 * | 8/2011 | Nakamura et al. | 382/127 |

FOREIGN PATENT DOCUMENTS

| | | |
|---|---|---|
| DE | 693 24 615 T2 | 9/1999 |
| EP | 0 551 086 A2 | 7/1993 |
| EP | 1 760 636 A2 | 3/2007 |
| EP | 2 104 059 A1 | 9/2009 |

(Continued)

OTHER PUBLICATIONS

International Search Report corresponding to PCT/JP2012/070090 dated Nov. 6, 2012 (5 pages).

*Primary Examiner* — Daniel Mariam
(74) *Attorney, Agent, or Firm* — Wilmer Cutler Pickering Hale and Dorr LLP

(57) ABSTRACT

A ridge direction extraction unit, which analyzes the shape of a ridge in a fingerprint image and extracts the ridge direction that indicates the slope of the ridge, includes: a low confidence region density value conversion module that reduces the density values in a low confidence region to generate a density conversion image; a synthesized image generating module for synthesizing a high confidence region and the low confidence region to generate a synthesized image; an auxiliary direction determining function for determining which ridge direction in the synthesized image is to be the auxiliary direction and deriving the degree of confidence in the auxiliary direction; and a high confidence region expanding module for calculating the degree of confidence in the direction, and correcting the ridge direction in the low confidence direction contiguous with the high confidence region so as to increase the degree of confidence in the ridge direction.

6 Claims, 17 Drawing Sheets

(56) References Cited

FOREIGN PATENT DOCUMENTS

| JP | 52-097298 A | 8/1977 |
| JP | 05-181956 A | 7/1993 |
| JP | 08-007097 A | 1/1996 |
| JP | 2002-288641 A | 10/2002 |
| JP | 2002-288672 A | 10/2002 |
| JP | 2007-065900 A | 3/2007 |
| JP | 2007-102422 A | 4/2007 |
| JP | 2009-223562 A | 10/2009 |

\* cited by examiner

FIG. 7A
FIG. 7B
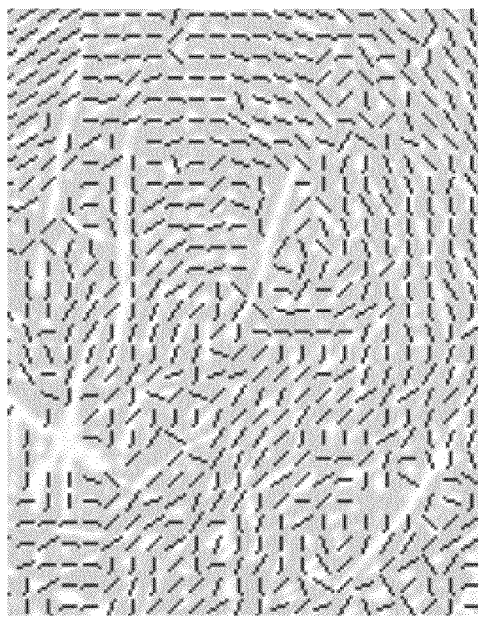
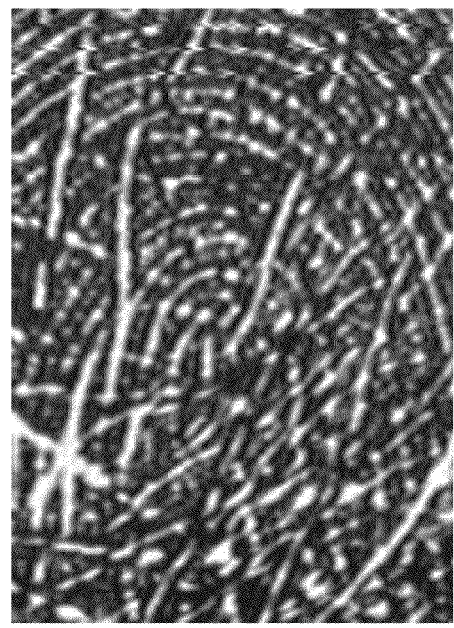

RIDGE DIRECTION EXTRACTION DEVICE, RIDGE DIRECTION EXTRACTION METHOD, AND RIDGE DIRECTION EXTRACTION PROGRAM

CROSS-REFERENCE TO RELATED APPLICATIONS

This application is a national stage application of International Application No. PCT/JP2012/070090 entitled "Ridge Direction Extraction Device, Ridge Direction Extraction Method, and Ridge Direction Extraction Program," filed on Aug. 7, 2012, which claims the benefit of the priority of Japanese patent application No. 2011-181080, filed on Aug. 23, 2011, the disclosures of each of which are hereby incorporated by reference in their entirety.

TECHNICAL FIELD

The present invention relates to a fingerprint collation system which performs collation of fingerprints based on fingerprint ridges contained in fingerprint images, and to a ridge direction extraction device and the like which extract the directions of the fingerprint ridges in fingerprint images.

BACKGROUND ART

When performing collation of an inputted fingerprint image and fingerprint data stored in advance, a fingerprint collation device generally extracts the directions of fingerprint ridges showing the fingerprint ridge directions in the fingerprint image and performs fingerprint collation processing based thereon. Through accurately extracting the directivity of the ridges contained within the fingerprint image, the accuracy of the fingerprint collation processing is improved. Thus, devices and methods for extracting the ridge directions have been disclosed.

As a related technique thereof, known is a ridge direction determining device which acquires the extreme value of the gradation fluctuation amount for a plurality of quantization directions set in advance within an image by utilizing the fact that the gradation fluctuation of pixels is small in the direction same as the direction of stripes (direction along the stripe lines) in an image with a stripe pattern and the gradation fluctuation of the pixels is large in the direction orthogonal to the stripes, and determines the direction of the stripes (stripe lines) based on the extreme value, i.e. determines the ridge direction (Patent Document 1). Further, as a related technique thereof, known is a device which determines the ridge direction by calculating a gradient vector in pixels which determine the ridge direction (Patent Document 2).

For extracting the ridge direction, it is common not to calculate the ridge directions in all the pixels but to extract the ridge direction in a small region unit of about 8×8 pixels for reducing the calculation amount.

With the above-described related techniques, the ridge direction is extracted locally. "Locally" herein means that the ridge direction is determined by using only the gradation of a pixel group in the vicinity of the target pixel, and the consistency with the ridge direction of the entire fingerprint is not taken into consideration.

Further, in Patent Document 2 described above, a region where the ridge directions are stable within a relatively wide area within an image is defined as a direction stable region, and a region where the directions change drastically such as the regions in the vicinity of the core and a delta is defined as a direction fluctuating region. Further, a region within an image where influence of noises such as wrinkles and blur is small so that extraction of the ridge direction is easy is defined as a high confidence region, and a region where influence of noises such as wrinkles and blur is large so that extraction of the ridge direction is difficult is defined as a low confidence region.

Thus, there may be chances of extracting wrong directions due to the influences of wrinkles and blur since extraction is done locally by using the gradation change only in the neighborhood pixel group with Patent Documents 1 and 2 described above. Further, there is also an inconvenience that a proper ridge direction cannot be extracted in a region where the ridge curvature is large such as in the vicinity of the core and the vicinity of the delta in a fingerprint image.

As a related technique thereof, there is known a method which performs smoothing of the ridge direction pattern for modifying the incorrectly extracted ridge direction (Patent Document 3).

Further, as a related technique thereof, there is disclosed a method which performs two-dimensional Fourier transformation in a local region where the ridge direction is to be defined, analyzes peaks of the Fourier transformation plane acquired as a result and, when there are a plurality of direction candidates (a plurality of peaks), determines the direction that exhibits a small confliction between the direction of the neighborhood region with an energy minimizing method. Further, there is also disclosed a method which expands an adaptable range through adapting the evaluation system of the energy minimizing method in the direction stable region and the direction fluctuating region (Patent Documents 4, 5).

Further, as a related technique thereof, there is disclosed a method which corrects the degree of confidence in the direction of the neighborhood region by using the ridge direction determined at a certain point, and determines the ridge direction of the neighborhood region by reevaluating the corrected degree of the direction confidence (Patent Document 6).

With Patent Document 6, extraction of the ridge direction exhibiting a small confliction is performed also in the direction fluctuating region by repeating the processing for reevaluating the degree of the direction confidence (direction propagation processing).

Patent Document 1: Japanese Unexamined Patent Publication Sho 52-97298
Patent Document 2: Japanese Unexamined Patent Publication Hei 8-7097
Patent Document 3: Japanese Unexamined Patent Publication Hei 5-181956
Patent Document 4: Japanese Unexamined Patent Publication 2002-288641
Patent Document 5: Japanese Unexamined Patent Publication 2002-288672
Patent Document 6: Japanese Unexamined Patent Publication 2007-65900

However, the smoothing processing of the ridge directions depicted in Patent Document 3 described above depends on the ridge directions locally extracted by the ridge direction extracting processing and the direction confidence data thereof. Thus, when the accuracy of the extracted ridge directions or the direction confidence data thereof is low, the accuracy in the smoothened ridge directions becomes low as well.

For example, when a wrong ridge direction is extracted in a wide range of region within an image due to the influence of the noises such as wrinkles within a fingerprint image, it is not possible to perform correction with the smoothing processing. Further, it is not possible to normalize (correct) the ridge directions extracted by the smoothing processing in the regions in the vicinity of the core and the delta where the ridge directions change drastically because the ridge curvature is large.

Further, the related techniques depicted in Patent Documents 4 and 5 described above exhibit a large effect in the direction stable region. However, there is a limit in the effect with the direction fluctuating region, so that a wrong ridge direction may be extracted. It is considered to be so because there is a limit for adapting the energy minimizing method to the direction fluctuating region.

For example, in a case where the ridge direction data that is extracted from the fingerprint image shown in FIG. 4 by using the method disclosed in Patent Document 4 and Patent Document 5 is superimposed on the original fingerprint image, the ridge direction within an elliptic broken-line region is extracted incorrectly as shown in FIG. 16. The broken-line region is a region including the center (core) that is the direction fluctuating region within the fingerprint image.

Further, the related technique depicted in Patent Document 6 described above exhibits a large effect on extracting a proper ridge direction in the direction fluctuating region. However, there is a limit in the effect with the low confidence region, so that a wrong ridge direction may be extracted.

This is because the degree of confidence of the noise direction in an image with the noises such as prominent wrinkles and blur is extremely higher than the degree of confidence of the ridge direction, so that it is not possible to determine (specify) the proper ridge direction only by correcting the degree of confidence.

For example, FIG. 17 shows an image in which the ridge direction data extracted by using the technique disclosed in Patent Document 6 described above is superimposed on the fingerprint image shown in FIG. 4.

FIG. 17 shows that the ridge directions extracted within the elliptic broken-line region contain the ridge direction extracted incorrectly (wrong extraction). The noise of wrinkles is prominent within the broken-line region, so that the degree of confidence indicating that the ridge direction is extracted properly is extremely low. Thus, it is not possible to perform rectification effectively by correcting the degree of confidence.

It is an object of the present invention to improve the inconveniences of the related techniques described above and to provide a ridge direction extraction device, a ridge direction extraction method, and a ridge direction extraction program, which are capable of accurately extracting the ridge direction in a fingerprint image regardless of the ridge shape.

DISCLOSURE OF THE INVENTION

In order to achieve the foregoing object, the ridge direction extraction device according to the present invention includes a ridge direction extraction unit which performs extraction of a ridge direction showing a slope direction of the ridge by analyzing shape of the ridge within a fingerprint image.

Further, the ridge direction extraction unit includes: a ridge direction determining module which determines the ridge direction as a main direction through evaluating a density difference between a target region set on the ridge and a surrounding region connected thereto, and calculates a degree of confidence in the direction showing accuracy of the main direction; a high confidence region setting module which extracts the target region where the degree of confidence in the direction is equal to or higher than a specific value and, sets a region connected to the region as a high confidence region; a low confidence region density conversion module which generates a density converted image through decreasing a density value within the low confidence region that is the region other than the high confidence region within the fingerprint image along the determined main direction; and a synthesized image generating module which generates a synthesized image in which the high confidence region in the fingerprint image and the low confidence region in the density converted image are synthesized.

Further, the ridge direction determining module includes an auxiliary direction determining function which determines a ridge direction in the synthesized image as an auxiliary direction and derives a degree of auxiliary direction confidence that shows accuracy of the auxiliary direction.

The ridge direction extraction unit further includes a high confidence region expanding function which calculates the degree of confidence in the direction based on the main direction in the fingerprint image and the auxiliary direction in the synthesized image, and corrects the ridge direction in the low confidence region connected to the high confidence region so as to increase the degree of confidence in the direction.

Further, the ridge direction extraction method according to the present invention is regarding a method for performing extraction of a ridge direction that is a slope direction of the ridge, which is used in a ridge direction extraction device including a ridge direction extraction unit which analyzes shape of the ridge within a fingerprint image. The method includes: determining the ridge direction as a main direction through evaluating a density difference between a target region set on the ridge and a surrounding region connected thereto, and calculating a degree of confidence in the direction showing accuracy of the main direction; extracting the target region where the degree of confidence in the direction is equal to or higher than a specific value, and setting a region connected to the region as a high confidence region; generating a density converted image through decreasing a density value within the low confidence region that is the region other than the high confidence region within the fingerprint image along the determined main direction; generating a synthesized image in which the high confidence region in the fingerprint image and the low confidence region in the density converted image are synthesized; determining a ridge direction in the synthesized image as an auxiliary direction, and deriving a degree of auxiliary direction confidence that shows accuracy of the auxiliary direction; and calculating the degree of confidence in the direction based on the main direction in the fingerprint image and the auxiliary direction in the synthesized image, and correcting the ridge direction in the low confidence region connected to the high confidence region so as to increase the degree of confidence in the direction, wherein each of the operation steps are executed by the ridge direction extraction unit.

Further, the ridge direction extraction program according to the present invention is regarding a program for performing extraction of a ridge direction that is a slope direction of the ridge, which is used in a ridge direction extraction device including a ridge direction extraction unit which analyzes shape of a ridge within a fingerprint image. The program causes a computer provided in advance to the ridge direction extraction unit to execute: a ridge direction determining function which determines the ridge direction as a main direction through evaluating a density difference between a target region set on the ridge and a surrounding region connected thereto, and calculates a degree of confidence in the direction showing accuracy of the main direction; a high confidence region setting function which extracts the target region where the degree of confidence in the direction is equal to or higher than a specific value, and sets a region connected to the region as a high confidence region; a low confidence region density conversion function which generates a density converted image through decreasing a density value within the low confidence region that is the region other than the high confidence region within the fingerprint image along the determined main direction; a synthesized image generating function which generates a synthesized image in which the high confidence region in the fingerprint image and the low confidence region in the density converted image are synthesized; an auxiliary direction determining function which determines a ridge direction in the synthesized image as an auxiliary direction, and derives a degree of auxiliary direction confidence that shows accuracy of the auxiliary direction; and a high confidence region expanding function which calculates the degree of confidence in the direction based on the main direction in the fingerprint image and the auxiliary direction in the synthesized image, and corrects the ridge direction in the low confidence region connected to the high confidence region so as to increase the degree of confidence in the direction.

The present invention is structured and functions in the manner described above. Through providing the structure which corrects the ridge direction determined in advance within the low confidence region of a fingerprint image so as to increase the degree of confidence in the direction calculated based on the main direction in the fingerprint image and the auxiliary direction in a synthesized image, it is possible to provide the ridge direction extraction device, the ridge direction extraction method, and the ridge direction extraction program, which are capable of accurately extracting the ridge direction in a fingerprint image regardless of the ridge shape.

BRIEF DESCRIPTION OF THE DRAWINGS

FIG. 7A is an explanatory image which is an enlarged view of a region of FIG. 6A where noises are actualized, and FIG. 7B is an explanatory image showing a region in the fingerprint image corresponding to FIG. 7A;

BEST MODES FOR CARRYING OUT THE INVENTION

Exemplary Embodiment

Next, basic structural contents of an exemplary embodiment of the present invention will be described.

Figure 1:
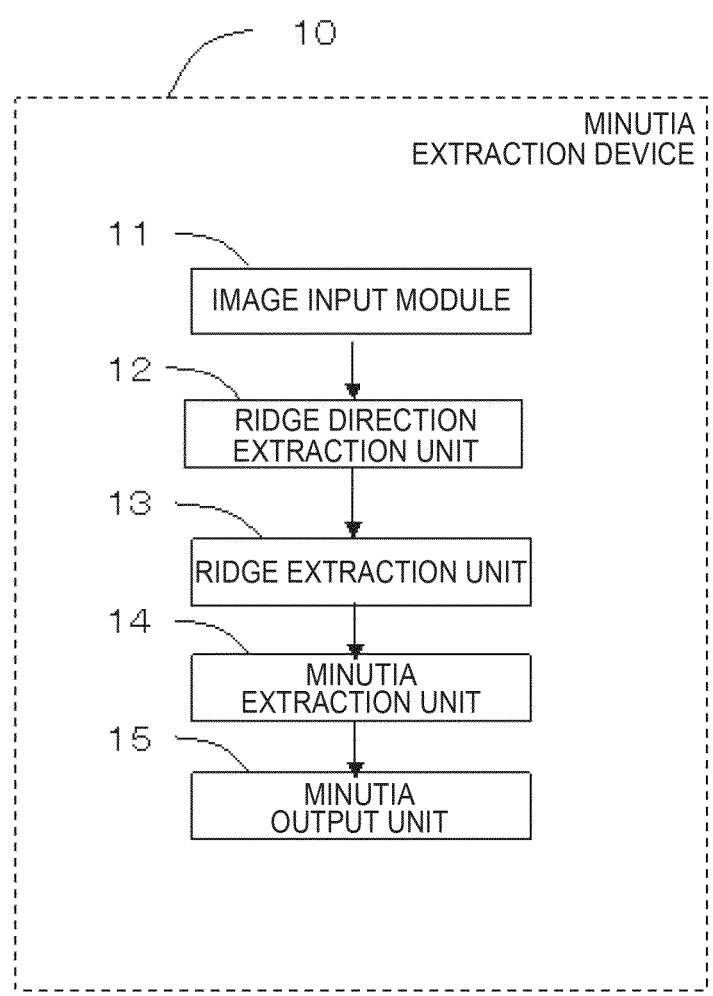
FIG. 1 is a block diagram showing an example of a minutia extraction device according to an exemplary embodiment.

As shown in FIG. 1, a minutia extraction device (a ridge direction extraction device) 10 as the exemplary embodiment has the structure which includes: a fingerprint image input module unit 11 which digitizes and inputs an image of a fingerprint (or a palm print) read by using a sensor or a scanner; a ridge direction extraction module unit 12 which extracts directions of ridges contained in the fingerprint image inputted from the fingerprint image input module unit 11; a ridge extraction module unit 13 which performs processing for extracting fingerprint ridges from the fingerprint image by using direction data extracted by the ridge direction extraction module unit 12; a minutia extraction module unit 14 which extracts positions of minutiae from the extracted ridges; and a minutia output module unit 15 which outputs information regarding each of the minutiae based on the extracted positions of the minutiae.

The image input module unit 11 may be set to input a fingerprint image file in which fingerprint images are digitized in advance to the direction extraction module unit 12.

Hereinafter, the inside structure of the ridge direction extraction unit 12 having the features according to the current Description will be described in details by referring to the block diagram shown in FIG. 2.

Figure 2:
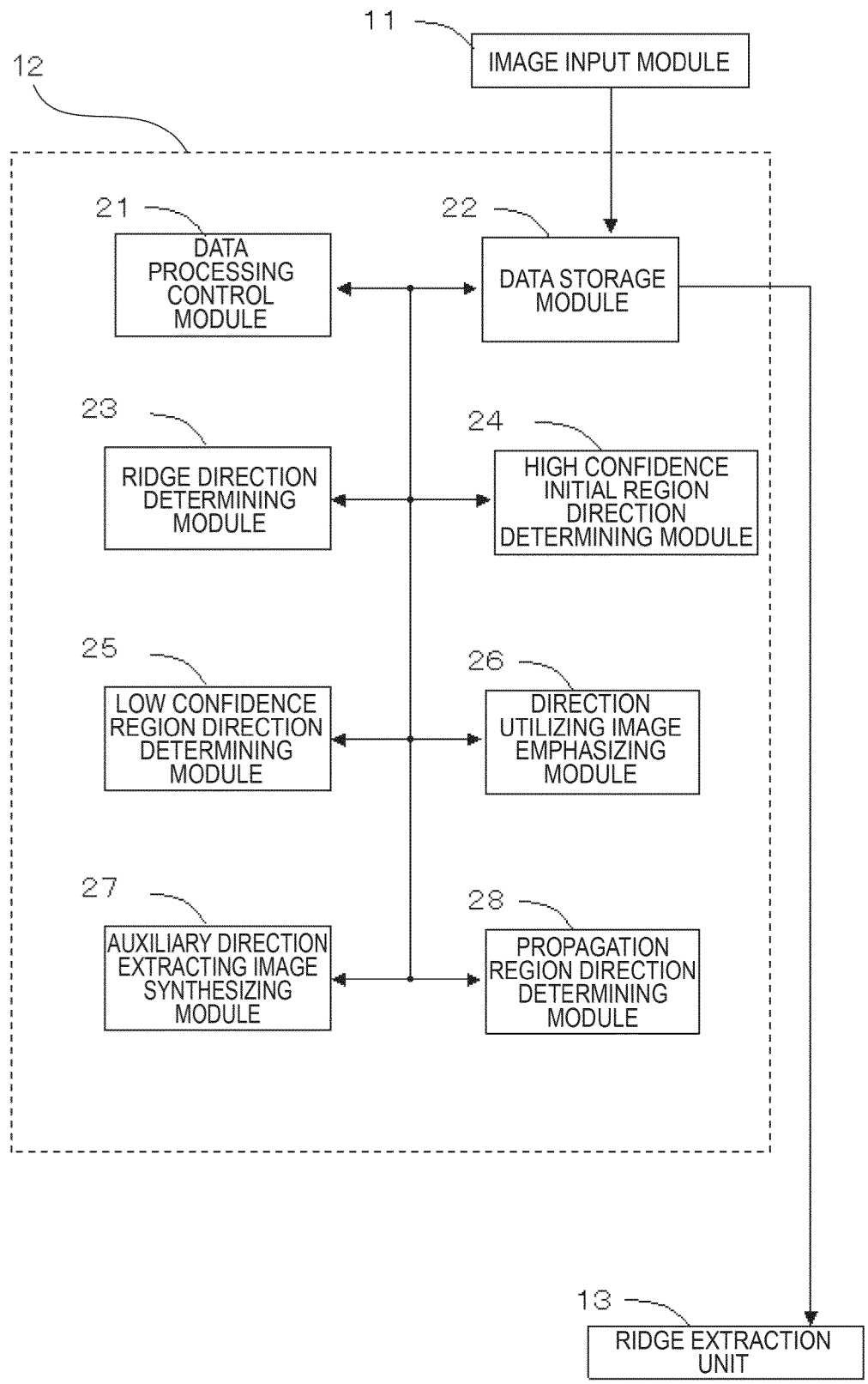
FIG. 2 is a schematic block diagram showing an inside structure of a ridge direction extraction unit included in the minutia extraction device disclosed in FIG. 1.

As shown in FIG. 2, the ridge direction extraction unit 12 has a structure which includes: a ridge direction determining module 23 which determines ridge directions in a target region that is set on ridge lines included in a fingerprint image; a high confidence region direction determining module 24 which determines a region that is judged to have the accuracy of the ridge direction determined by the ridge direction determining module 23 higher than a specific value; a low confidence region direction determining module 25 which specifies a low confidence region that is a region other than the high confidence region in the inputted image (fingerprint image), and determines the ridge directions in the low confidence region; a direction utilizing image emphasizing module 26 which performs conversion of pixel density values in the fingerprint image along the determined ridge directions within the determined low confidence region; an auxiliary direction extracting image synthesizing module 27 which performs synthesizing processing of the high confidence region and the low confidence region, and extracts ridge directions in the synthesized image; and a propagation region direction determining module 28 which performs processing for expanding the high confidence region through correcting the direction in the low confidence region neighboring to the high confidence region based on the extracted ridge directions.

The ridge direction extraction unit 12 further includes: a data processing control module 21 which controls exchange of data and messages between each of the modules constituting the ridge direction extraction unit 12; and a data storage unit 22 which temporarily stores the image and direction data calculated by each of the modules.

The data storage module 22 is constituted with a RAM (Random Access Memory), for example, and it is used as a processing work region by each of the modules which constitute the ridge direction extraction unit 12. Further, the data storage module 21 is also used for storing the data (fingerprint images and the like) which are exchanged among the fingerprint image input unit 11, the ridge extraction module unit 13, and the ridge direction extraction unit 12 mutually.

Figure 4:
FIG. 4 is an explanatory image showing an example of a fingerprint image that is a target of ridge direction extraction done by the minutia extraction device disclosed in FIG. 1.

Here, an example of the input image (fingerprint image) as a target of direction extraction is shown in FIG. 4. In FIG. 4, wrinkles are actualized within the fingerprint region. Thus, extraction of the correct ridge directions in the fingerprint image is obstructed.

The fingerprint image as the input image is digitized in the resolution of 500 dpi according to ANSI/NIST-ITL-1-2000 Data Format for the Interchange of Fingerprint, Facial, & Tattoo (SMT) Information standardized by the U.S. National Institute of Standards and Technology.

The standardized documents, as of July in 2011, can be downloaded from a following URL (Uniform Resource Locator).
ftp://sequoyah.nist.gov/pub/nist_internal_reports/sp500-245-a16.pdf In the fingerprint image generated according to the standards described above, each of the pixels constituting the fingerprint image has one of density values of 256 gradations from 0 to 255. Further, with the luminance standards according to the above-described standards, the larger density value means the larger (brighter) luminance.

In the explanations provided below, it is to be noted that the larger density value means the larger (darker) density. Thus, the density value of the pixels constituting a ridge part with a large (dark) density is close to 255 that is the maximum value, while the density value of the pixels constituting a paper or a ridge groove part with a small (light) density is close to 0 that is the minimum value. Note here that the ridge groove shows a band-like part sandwiched between two neighboring ridges.

The ridge direction determining module 23 constituting a part of the ridge direction extraction unit 12 includes: a ridge direction determining function which determines ridge directions by evaluating the density difference between the target region set on the ridges and a surrounding region connected thereto; and a ridge direction deriving function which extracts the ridge direction (referred simply to as "direction" hereinafter) and the degree of confidence in the direction.

Note here that the ridge direction determining module 23 includes a function which determines the degree of confidence in the direction which shows the accuracy of each of the extracted directions based on the mutual relation of the different ridge directions contained in a specific region set on the fingerprint image.

In other words, the ridge direction determining module 23 includes a function which determines the ridge direction as a main direction through evaluating the density difference between the target region set on the ridges and a surrounding region connected thereto, and determines the ridge direction with which the degree of confidence in the direction showing the accuracy of the main direction is calculated.

As the direction method in this case, the ridge direction and the degree of confidence in the direction may be determined by evaluating the density differences of each direction designated in advance as disclosed in Japanese Unexamined Patent Publication Sho 52-97298, for example.

Note here that the direction extracted as the ridge direction is the direction of the highest degree of the confidence among the sixteen candidate directions (sixteen directions) as the ridge directions. In the exemplary embodiment, this direction is defined as the main direction.

Figure 5:
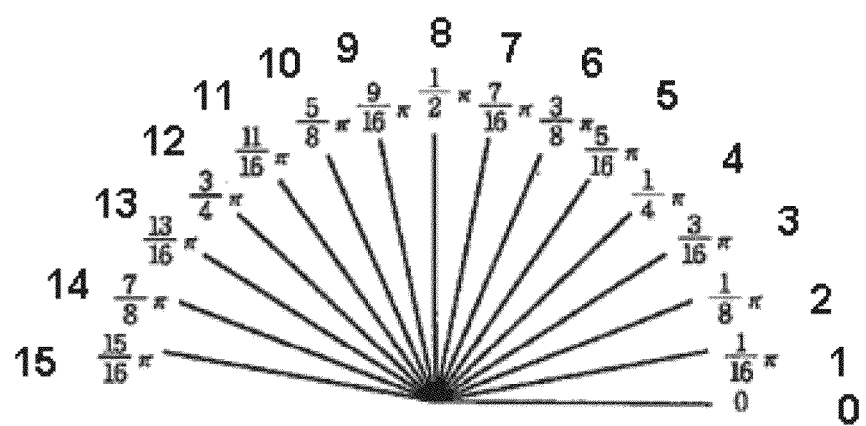
FIG. 5 is an explanatory chart showing an example of a direction pattern divided into sixteen pieces used in the ridge direction extraction unit disclosed in FIG. 2.

The ridge directions are quantized in sixteen directions and coded as shown in FIG. 5, for example. Herein, the ridge directions are shown in sixteen (1 to 16) stages of directions added up by a unit of $\pi/16$ radian counterclockwise from the horizontal direction (0) as the base. Note here that the ridge direction means "a direction" of a ridge (a curve or a straight line) within a fingerprint image, i.e., "a slope of a ridge with a direction" within an image (In some cases, "direction" may be referred to as "slop direction").

Further, in the exemplary embodiment, the ridge direction is defined for each pixel (x, y) (i.e., a unit of one pixel) within the fingerprint image. It is also possible to divide the fingerprint image into specific zones (blocks) of 4×4 pixels, 8×8 pixels, or the like and to define the ridge direction in a unit of each block.

Further, when illustrating the extracted ridge directions, the ridge directions are sampled and illustrated by every eight pixels both in the horizontal direction and the vertical direction so that the directions can be easily viewed.

Figure 6A:
FIG. 6A is an explanatory image in which extracted ridge directions are superimposed on a fingerprint image of FIG. 4.

For example, FIG. 6A is an image in which the ridge directions (direction data) extracted based on the fingerprint image of FIG. 4 are superimposed on the fingerprint image (FIG. 4). Further, FIG. 6B shows the degree of confidence in the direction of the direction data shown in FIG. 6A with the density (by displaying gradations), in which the larger density (darker) means the higher degree of confidence in the direction.

Regarding the pixels from which the direction components cannot be extracted, the directions of the pixels are not shown.

Figure 6B:
FIG. 6B is an explanatory image showing the degree of confidence in the direction of direction data of FIG. 6A displayed with gradations.

Comparing FIG. 6A with FIG. 6B, it can be seen that the region with many wrinkles within the fingerprint image has the low degree of confidence in the direction (i.e., the low density) and that such region contains many incorrectly extracted ridge directions.

FIG. 7A shows an enlarged view of a part of the region with prominent wrinkles (containing wrinkles) of FIG. 6A. Further, FIG. 7B shows a region of the fingerprint image (input image) corresponding to FIG. 7A.

The above-described high confidence initial region direction determining module 24 includes a high confidence region extracting function which extracts all the pixels whose degree of confidence in the direction is higher than a threshold value set in advance.

Further, the high confidence initial region direction determining module 24 includes a high confidence region determining function which determines regions to which the extracted pixels are connected (contiguous pixel regions). Hereinafter, such contiguous pixel region is referred to as a high confidence region.

That is, the high confidence initial region direction determining module 24 includes a high confidence region setting function which extracts the target region whose degree of confidence in the direction is equal to or higher than the specific value and sets the region (contiguous pixel region) to which the region is connected as the high confidence region.

Here, the threshold value of the degree of confidence in the direction is set in advance so that incorrect extraction does not occur even when noises such as wrinkles and blur are contained. The region determined by the first high confidence region determining processing executed by the high confidence initial region direction determining module 24 is referred to as a high confidence initial region.

Figure 8:
FIG. 8 is an explanatory image showing ridge directions in an initial region determined as a high confidence region by the ridge direction extraction unit disclosed in FIG. 2.

FIG. 8 shows the region directions in the high confidence initial region determined in this manner. The outer ends of the high confidence regions are not shown herein. The regions where the ridge directions are shown are the high confidence regions. FIG. 8 shows that the incorrectly extracted ridge directions are not included within the high confidence initial regions.

The low confidence region direction determining module 25 includes a low confidence region specifying function which specifies low confidence regions that are regions other than the high confidence region, and a low confidence region direction determining function which determines the ridge directions in the low confidence regions.

Figure 9A:
FIG. 9A is an explanatory image showing ridge directions determined as a high confidence region by the ridge direction extraction unit.

FIG. 9A shows the determined low confidence regions and the ridge directions in the low confidence regions.

Further, the low confidence region direction determining module 25 may be set to determine the low confidence region directions by taking the low confidence region as the region other than the high confidence region (i.e., the region where the ridge direction is extracted in advance in the region other than the high confidence region) which is determined by the high confidence initial region direction determining module 24.

Here, the significance for executing the processing for determining the low confidence region direction (the low confidence region direction determining function) will be described.

Normally, when there are noises such as wrinkles and blur within the fingerprint image (palm print image), it is not easy to extract the accurate ridge directions so that the ridge directions are not necessarily extracted properly. Especially when the noises are prominent, it is possible that the noise direction showing the slope of the noise within the image is incorrectly extracted as the ridge direction.

For example, in FIG. 9A, the direction of the noise (the noise direction) and the ridge direction, i.e., both the main direction and the noise direction, are included (mixed) in the ridge directions extracted within the low confidence region.

Note here that it is considered that the proportion of incorrectly extracting the noise direction as the main direction (area rate) becomes large when the noises are prominent within the low confidence region. Thus, when it is assumed that the main direction extracted within the low confidence region represents the noise direction and processing for eliminating the density component along the noise direction is performed, the ridge direction that is originally supposed to be extracted is enhanced to be more clearly viewed in the image (eliminated image) on which the processing is performed.

Further, it is set to perform smoothing on the directions so that the noise direction can be extracted more accurately in each of the low confidence regions within the image. The processing for smoothing the directions may be executed by employing the technique disclosed in Japanese Unexamined Patent Publication Hei 5-181956, for example.

Further, the low confidence region direction determining module 25 includes a function which derives a direction dispersion value which shows dispersion of the extracted ridge directions at the point where the smoothing processing is performed.

Figure 9B:
FIG. 9B is an explanatory image showing ridge directions in a low confidence region derived by performing smoothing processing on FIG. 9A.

Here, FIG. 9B shows the ridge directions in the low confidence region derived by the smoothing processing. In FIG. 9B, the directions after executing the smoothing are shown.

FIG. 9A contains the part where the region in which the direction is defined is eliminated. Here, the low confidence region direction determining module 25 performs the direction smoothing in order to improve the accuracy for extracting the directions described later.

Further, the probability of succeeding the direction smoothing becomes low in the region where the direction dispersion is large. Thus, the low confidence region direction determining module 25 may be set to judge that the pixel region where the derived direction dispersion value is large (i.e., higher than the specific value) is low in the direction confidence after the smoothing processing and to eliminate the extracted ridge direction.

Hereinafter, the ridge direction determined by performing the smoothing processing is employed as the main direction, and the processing thereafter is to be performed.

The direction utilizing image emphasizing module 26 further includes an image density conversion function which performs density conversion processing on the input image by using the ridge direction (referred to as a "designated direction") within the determined low confidence region so as to decrease the density difference in the components along the designated direction. That is, the direction utilizing image emphasizing module 26 includes a low confidence region density value conversion function which generates a density converted image by decreasing the density value of the above-described low confidence region (the region other than the high confidence region within the fingerprint image) along the determined main direction.

The image density conversion function may be performed through employing the technique disclosed in Japanese Unexamined Patent Publication 2010-010348, for example.

When the main direction (the designated direction within the low confidence region) represents the noise direction as a result of executing the image density conversion function, the noise direction component is eliminated. Hereinafter, the processing for converting the density is referred to as the direction utilizing image emphasizing processing subjected to eliminate the main direction component.

Further, when the main direction represents the ridge direction (i.e., when not the noise direction but the ridge direction is extracted properly as the designated direction), the ridge direction is eliminated by the direction utilizing image emphasizing processing. However, when the main direction represents the ridge direction, the main direction becomes the first candidate for judgment at the time of direction propagation. Thus, it is considered that the chance of deteriorating the propagation performance is low. Therefore, it is possible to suppress deterioration of the propagation performance.

Figures 10A, 10B:
FIG. 10A is an explanatory image showing a result acquired by performing density component elimination by using the ridge direction before execution of the smoothing processing shown in FIG. 9A.
FIG. 10B is an explanatory image showing a result acquired by performing density component elimination processing on the image shown in FIG. 9B on which the smoothing processing is performed.

FIGS. 10A and 10B show images from which the density components along the designated direction are eliminated by the above-described processing. FIG. 10A shows the image from which the density components are eliminated by using the directions before performing the smoothing as shown in FIG. 9A. Further, FIG. 10B shows the image from which the density components are eliminated by using the directions after performing the smoothing as shown in FIG. 9B.

Comparing FIG. 10A with FIG. 10B, it can be seen that the components along the directions of the wrinkles in FIG. 10B are more eliminated.

Further, the above-described auxiliary direction extracting image synthesizing module 27 includes a function which employs pixel densities of the input image for the pixels within the high confidence region and employs image densities enhanced by the direction utilizing image emphasizing module 26 to perform synthesizing processing of the images (an image synthesizing processing function/a synthesized image generating function) for the pixels within the low confidence region.

It is expected here that the synthesized image contains a partial image showing the ridges of the input image (fingerprint image) in the high confidence region and a partial image in which the noise components are eliminated and the ridges are enhanced in the low confidence region. Hereinafter, the synthesized image is defined as the auxiliary direction extracting image.

Figure 11A:
FIG. 11A is an explanatory image showing a result acquired by performing synthesizing processing by using the image of FIG. 10A.
Figure 11B:
FIG. 11B is explanatory image showing a result acquired by performing synthesizing processing by using the image of FIG. 10B.

Examples of the synthesized image are shown in FIGS. 11A and 11B. FIG. 11A shows the image acquired by performing synthesizing processing by using the image of FIG. 10A, and FIG. 11B shows the image acquired by performing the synthesizing processing by using the image of FIG. 10B.

Comparing FIG. 11A with FIG. 11B, it can be seen that the components (densities) along the directions of the wrinkles are eliminated in the low confidence region.

Here, the significance of the processing for synthesizing the images (synthesizing processing) will be described.

For extracting the directions in the fingerprint image, it is necessary to analyze the image of a somewhat wide region. Thus, as shown in FIG. 10A, in a case where the auxiliary direction is extracted by using the image before being synthesized, there is a possibility of failing the extraction of the auxiliary direction in the region neighboring to the high confidence region (i.e., causing wrong extraction).

Thus, through synthesizing the partial image of the high confidence region where the ridges are expected to be clear and the partial image of the low confidence region, it is possible to generate an image (synthesized image) from which the auxiliary direction can be extracted more properly.

The above-described ridge direction determining module 23 includes an auxiliary direction extracting function which performs processing for extracting the ridge direction (the auxiliary direction) and the degree of confidence in the direction of the auxiliary direction by using the synthesized auxiliary direction extracting image (the synthesized image) described above. Note here that the ridge direction determining module 23 derives the direction (the auxiliary direction) and the degree of confidence in the direction based on the auxiliary direction extracting image in the same manner as that of the extraction processing of the main direction. That is, the above-described ridge direction determining module 23 includes an auxiliary direction determining function which determines the ridge direction in the synthesized image as the auxiliary direction and derives the auxiliary direction confidence which shows the accuracy of the auxiliary direction.

As in the above-described case, the extraction processing may be performed by using the method which makes determination by evaluating the density differences in each of the directions designated in advance disclosed in Japanese Unexamined Patent Publication Sho 52-97298, for example.

The ridge directions extracted from the auxiliary direction extracting image contain the directions different from the extracted main direction. Thus, the ridge direction extracted by using the auxiliary direction extracting image is defined as the auxiliary direction hereinafter.

Figure 12A:
FIG. 12A is an explanatory image showing ridge directions extracted from an auxiliary direction extracting image by using the synthesized image of FIG. 11B.
Figure 12B:
FIG. 12B is an explanatory image showing the degree of confidence of the auxiliary directions shown in FIG. 12A.

The ridge directions (the auxiliary directions) extracted from the auxiliary direction extracting image are shown in FIG. 12A. FIG. 12A shows the auxiliary directions extracted by using the synthesized image of FIG. 11B. Further, FIG. 12B shows the degree of confidence in the direction of the auxiliary directions shown in FIG. 12A.

The above-described propagation region direction determining module 28 includes a high confidence region expansion processing function which corrects the degree of confidence in the direction of the low confidence regions (referred to as "propagation regions" hereinafter) neighboring to the high confidence region by using the direction data determined within the high confidence region, determines the directions in each of the propagation regions through analyzing the corrected degree of confidence, and performs processing to expand the direction determined region (i.e., the high confidence region) thereby.

Here, both the degrees of confidence of the main directions extracted in advance and the auxiliary direction are employed as the candidate directions and the degree of confidence in the direction.

That is, when the main direction represents the noise direction, propagation does not necessarily succeed. However, through evaluating the propagation possibility for the auxiliary direction as well in this case, it becomes possible to extract the ridge directions properly.

In other words, the propagation region direction determining module 28 includes a high confidence region expanding function which calculates the degree of confidence in the direction based on the main direction in the fingerprint image and the auxiliary direction in the synthesized image and corrects the ridge directions in the low confidence regions contiguous to the high confidence region so as to increase the degree of confidence in the direction.

Figure 13:
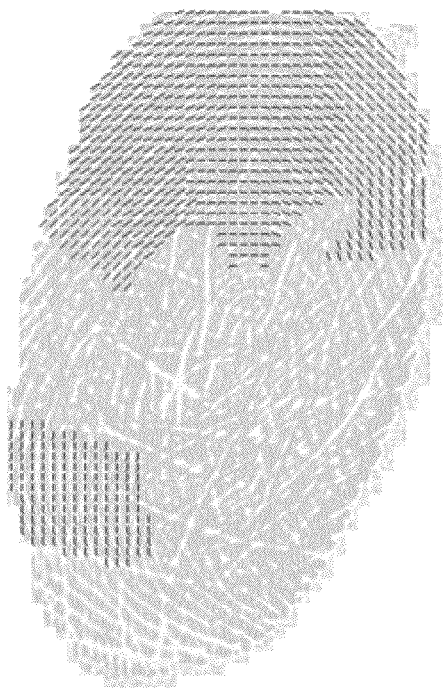
FIG. 13 is an explanatory image showing ridge directions of a region propagation-expanded by expansion processing done by the ridge direction extraction unit disclosed in FIG. 2.

FIG. 13 shows the direction data propagation-expanded by the above-described expansion processing. Comparing FIG. 13 with FIG. 8, FIG. 13 shows that the more proper ridge directions are propagation-expanded (extracted).

The above-described expansion processing may be performed by using the technique disclosed in Japanese Unexamined Patent Publication 2007-65900, for example.

Further, the above-described propagation region direction determining module 28 checks whether or not it matches an ending condition of the expansion processing set in advance. As the ending condition, it is set to be when the expansion processing of the region cannot be executed or when the designated number of times set in advance has been completed.

When it does not match the ending condition, the processing for determining the direction within the low confidence region is to be performed by taking the propagation expansion region at the current point as the high confidence region.

Further, the above-described propagation region direction determining module 28 performs the processing by taking not the input image but the latest synthesized image as the target image for performing the expansion processing of the high confidence region for the second time and thereafter.

Figure 14A:
FIG. 14A is an explanatory image showing a result acquired by performing propagation expansion processing recursively (second time) on the fingerprint image.
Figure 14B:
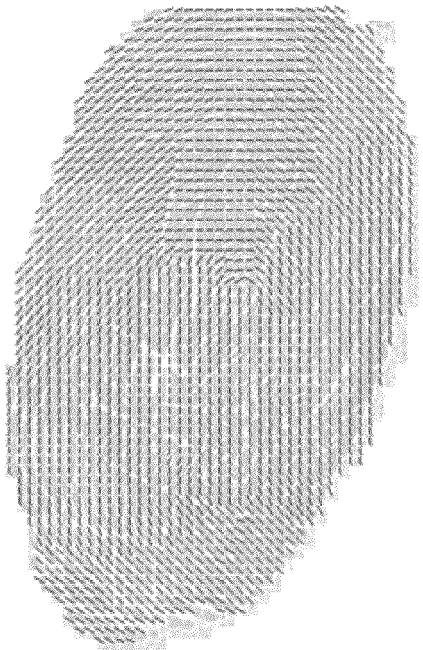
FIG. 14B is an explanatory image showing a result acquired by performing propagation expansion processing recursively (third time) on the fingerprint image.

Note here that FIG. 14A shows the result acquired by performing the propagation expansion processing recursively (second time), and FIG. 14B shows the result acquired by performing the propagation expansion processing recursively (third time). FIG. 14B shows that the noise directions in the propagation region in FIG. 14A are eliminated based on the region where the ridge directions are properly extracted, so that the ridge directions are corrected properly in FIG. 14B.

In the propagation region neighboring to the region where the ridge directions are extracted properly, the noise elimination is performed by using the direction data in which the ridge directions are extracted properly. Through performing the noise elimination recursively, it is expected that the low confidence region can be eliminated also in the image where the noise directions are enhanced.

The data processing control module 21 of the ridge direction extraction unit 12 includes a ridge direction data output function which outputs the ridge direction data showing the extracted ridge directions (stored in the data storage module) to the ridge extraction module unit 13.

As described above, the ridge direction extraction unit 12 of the minutia extraction device 10 as the exemplary embodiment can extract the accurate ridge directions in the region where the fluctuation of the ridge directions is large (dispersion of the directions is large within a specific region) in the fingerprint image (or the palm print image), i.e., in the direction fluctuating region and the region where the degree of confidence in the direction is low (the low confidence region) through employing the main direction extracted from the input image, the auxiliary direction extracted from the auxiliary direction extracting image that is the synthesized image, and the degrees of direction confidence corresponding to each of the directions.

Explanations of Operations of Exemplary Embodiment

First, the operations of the exemplary embodiment, especially the basic operations of the ridge direction extraction unit 12 that is the main part of the exemplary embodiment, will be described. Each of the structural components of the ridge direction extraction unit 12 sequentially operates as follows.

First, the ridge direction determining module 23 calculates the main direction and the degree of confidence in the direction showing the accuracy of the main direction through evaluating the density difference between the target region set on the ridge within the image and the surrounding region connected thereto (a ridge direction determining step).

Then, the high confidence region direction determining module 24 extracts the region where the degree of confidence in the direction is equal to or higher than a specific value and sets the region to which the region is connected as the high confidence region (a high confidence region setting step), and the low confidence region direction determining module 25 generates a density converted image through decreasing the density value within the low confidence region that is the region other than the high confidence region within the fingerprint image along the determined main direction (a low confidence region density value converting step).

Then, the direction utilizing image emphasizing module (the synthesized image generating module) 26 generates a synthesized image in which the high confidence region of the fingerprint image and the low confidence region of the density converted image are synthesized (a synthesized image generating step), determines the ridge direction in the synthesized image as the auxiliary direction, and derives the degree of auxiliary direction confidence that shows the accuracy of the auxiliary direction (an auxiliary direction determining step).

Then, the propagation region direction determining module (the high confidence region expanding module) 28 calculates the degrees of direction confidence based on the main direction in the fingerprint image and the auxiliary direction in the synthesized image, and corrects the ridge direction in the low confidence region connected to the high confidence region so as to increase the degree of confidence in the direction (a high confidence region expanding step).

Note here that the execution contents of the ridge direction determining step, the high confidence region setting step, the low confidence region density value converting step, the synthesized image generating step, the auxiliary direction determining step, and the high confidence region expanding step may be put into a program to be executed by a computer that is provided in advance to the ridge direction extraction unit 12.

The program may be recorded in a non-transitory recording medium such as a DVD, a CD, a flash memory, or the like. In that case, the program is read out from the recording medium and executed by the computer.

Next, specific operations of the main part (the ridge direction extraction unit 12) of the direction extraction module 12 of the minutia extraction device 10 as the exemplary embodiment will be described in details based on the flowchart of FIG. 3.

Figure 3:
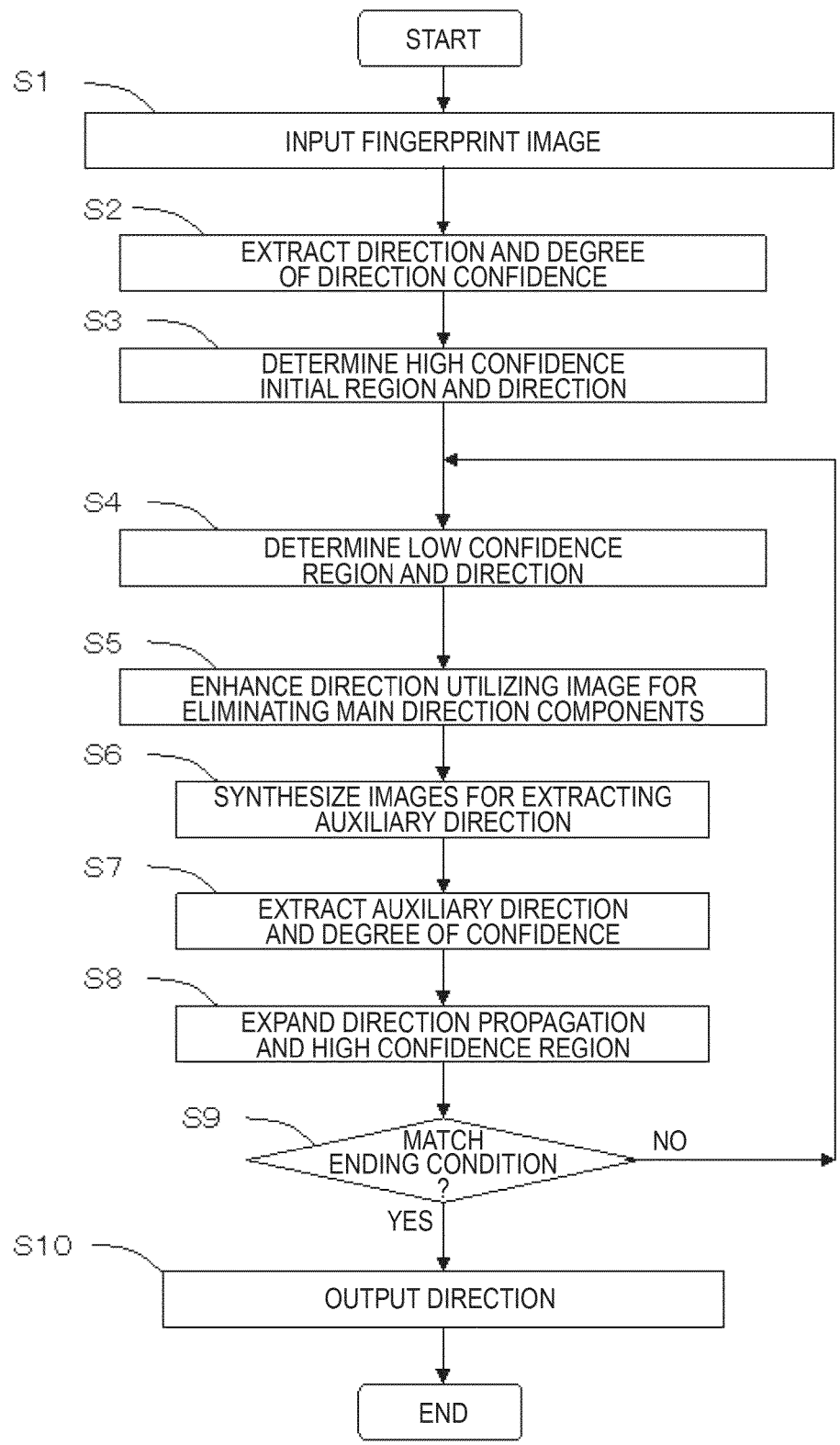
FIG. 3 is a flowchart showing operation processing steps of the ridge direction extraction unit disclosed in FIG. 2.

First, the image input module 11 inputs a fingerprint image to the ridge direction extraction unit 12 (FIG. 3: step S1). It is assumed herein that the image input module 11 digitizes the image read by using a scanner and inputs it to the direction extraction module 12, for example. Further, a fingerprint image file in which the fingerprint images are digitized in advance may be inputted to the ridge direction extraction unit 12.

Then, the ridge direction determining module 23 extracts (derives) the ridge direction (simply referred to as the "direction" hereinafter) and the direction reliability (FIG. 3: step S2). Here, those may be determined by evaluating the density differences in each of the directions designated in advance as disclosed in Japanese Unexamined Patent Publication Sho 52-97298, for example.

The direction extracted as the ridge direction in step S2 is considered as the direction whose reliability is the highest among the sixteen candidate directions (sixteen directions) of the ridge direction. In this exemplary embodiment, this direction is defined as the main direction. Note here that the ridge directions are quantized in sixteen directions and coded as shown in FIG. 5, for example. Herein, the ridge directions are shown in sixteen (1 to 16) stages of directions added up by a unit of $\pi/16$ radian counterclockwise from the horizontal direction (0) as the base.

Then, the high confidence initial region direction determining module 24 extracts all the pixels whose degree of confidence in the direction is higher than a threshold value set in advance, and then determines the region to which the extracted pixels are connected (the contiguous pixel region) (FIG. 3: step S3). Hereinafter, such contiguous pixel region is referred to as the high confidence region.

Here, the threshold value of the degree of confidence in the direction is set in advance so that incorrect extraction does not occur even when noises such as wrinkles and blur are contained. The region determined by the first high confidence region determining processing executed by the high confidence initial region direction determining module 24 is referred to as a high confidence initial region.

FIG. 8 shows the region directions in the high confidence initial region determined in this manner. The outer ends of the high confidence regions are not shown herein. The regions where the ridge directions are shown are the high confidence regions. FIG. 8 shows that the incorrectly extracted ridge directions are not included within the high confidence initial region.

Then, the low confidence region direction determining module 25 specifies low confidence regions that are regions other than the high confidence region, and determines the ridge directions in the low confidence regions (FIG. 3: step S4/a low confidence region direction determining processing).

FIG. 9A shows the determined low confidence regions and the ridge directions in the low confidence regions.

At this time, the low confidence region direction determining module 25 may be set to determine the low confidence region directions by taking the low confidence region as the region other than the high confidence region (i.e., the region where the ridge direction is extracted in advance in the region other than the high confidence region) which is determined by the high confidence initial region direction determining module 24.

Here, the significance for executing the processing for determining the low confidence region direction (the low confidence region direction determining function) will be described.

Normally, when there are noises such as wrinkles and blur within the fingerprint image (the palm print image), it is not easy to extract the accurate ridge directions so that the ridge directions are not necessarily extracted properly. Especially when the noises are prominent, it is possible that the noise direction showing the slope of the noise within the image is incorrectly extracted as the ridge direction.

For example, in FIG. 9A, the direction of the noise (the noise direction) and the ridge direction, i.e., both the main direction and the noise direction, are included (mixed) in the ridge directions extracted within the low confidence region.

Note here that it is considered that the proportion of incorrectly extracting the noise direction as the main direction (area rate) becomes large when the noises are prominent within the low confidence region. Thus, when it is assumed that the main direction extracted within the low confidence region represents the noise direction and processing for eliminating the density component along the noise direction is performed, the ridge direction that is originally supposed to be extracted is enhanced to be more clearly viewed in the image (eliminated image) on which the processing is performed.

Further, it is also possible to perform smoothing on the directions so that the noise direction can be extracted more accurately in each of the low confidence regions within the image.

Further, it can be judged that the direction confidence after the smoothing processing is small in the pixel region where the dispersion of the extracted ridge directions is large (i.e., higher than a specific value) at the point where the smoothing processing is performed, so that the extracted ridge directions are to be eliminated.

FIG. 9B shows the ridge directions in the low confidence region smoothed (the smoothing processing is performed) in the manner described above. That is, FIG. 9B shows the result acquired by performing the direction smoothing processing on the main direction within the low confidence region.

Hereinafter, the main direction on which the smoothing processing is performed is employed and the processing thereafter is to be performed.

Then, the direction utilizing image emphasizing module 26 performs density conversion processing on the input image by using the ridge direction (referred to as a "designated direction") within the low confidence region determined in step S4 of FIG. 3 so as to decrease the density difference in the components along the designated direction (FIG. 3: step S5). The above-described density conversion processing may be performed through employing the technique disclosed in Japanese Unexamined Patent Publication 2010-010348, for example.

When the main direction (the designated direction within the low confidence region) represents the noise direction as a result of executing the density conversion processing, the noise direction component is eliminated. Hereinafter, the processing for converting the density is referred to as the direction utilizing image emphasizing processing subjected to eliminate the main direction component.

Further, when the main direction represents the ridge direction (i.e., when not the noise direction but the ridge direction is extracted properly as the designated direction), the ridge direction is eliminated by the direction utilizing image emphasizing processing. However, when the main direction represents the ridge direction, the main direction becomes the first candidate for judgment at the time of direction propagation. Thus, it is considered that the chance of deteriorating the propagation performance is low. Therefore, it is possible to suppress deterioration of the propagation performance.

FIGS. 10A and 10B show images from which the density components along the designated direction are eliminated by the above-described processing. FIG. 10A shows the image from which the density components are eliminated by using the directions before performing the smoothing as shown in FIG. 9A. Further, FIG. 10B shows the image from which the density components are eliminated by using the directions after performing the smoothing as shown in FIG. 9B.

Comparing FIG. 10A with FIG. 10B, it can be seen that the components along the directions of the wrinkles in FIG. 10B are more eliminated.

Then, the auxiliary direction extracting image synthesizing module 27 employs pixel densities of the input image for the pixels within the high confidence region and employs image densities enhanced by the direction utilizing image emphasizing module 26 to perform synthesizing processing of the images (FIG. 3: step S6/a synthesizing processing) for the pixels within the low confidence region.

It is expected here that the synthesized image contains a partial image showing the ridges of the input image (fingerprint image) in the high confidence region and a partial image in which the noise components are eliminated and the ridges are enhanced in the low confidence region. Note here that the synthesized image is defined as the auxiliary direction extracting image.

Examples of the synthesized image are shown in FIGS. 11A and 11B. FIG. 11A shows the image acquired by performing synthesizing processing by using the image of FIG. 10A, and FIG. 11B shows the image acquired by performing the synthesizing processing by using the image of FIG. 10B.

Comparing FIG. 11A with FIG. 11B, it can be seen that the components (densities) along the directions of the wrinkles are eliminated in the low confidence region.

Here, the significance of the processing for synthesizing the images (synthesizing processing) will be described.

For extracting the directions in the fingerprint image, it is necessary to analyze the image of a somewhat wide region. Thus, as shown in FIG. 10A, in a case where the auxiliary direction is extracted by using the image before being synthesized, there is a possibility of failing the extraction of the auxiliary direction in the region neighboring to the high confidence region (i.e., causing wrong extraction).

Thus, through synthesizing the partial image of the high confidence region where the ridges are expected to be clear and the partial image of the low confidence region, it is possible to generate an image (synthesized image) from which the auxiliary direction can be extracted more properly.

Then, the ridge direction determining module 23 performs processing for extracting the ridge direction (the auxiliary direction) and the degree of confidence in the direction of the auxiliary direction by using the auxiliary direction extracting image synthesized in step S6 (FIG. 3: step S7).

Note here that the ridge direction determining module 23 derives the direction (the auxiliary direction) and the degree of confidence in the direction based on the auxiliary direction extracting image through the same procedure as that of step S2 described above.

As in the above-described case, the extraction processing may also be performed by using the method which makes determination by evaluating the density differences in each of the directions designated in advance disclosed in Japanese Unexamined Patent Publication Sho 52-97298, for example.

The ridge directions extracted from the auxiliary direction extracting image may contain the directions different from the main direction extracted in step S2. Hereinafter, the ridge direction extracted by using the auxiliary direction extracting image is defined as the auxiliary direction.

The ridge directions (the auxiliary directions) extracted from the auxiliary direction extracting image are shown in FIG. 12A. FIG. 12A shows the auxiliary directions extracted by using the synthesized image of FIG. 11B.

Further, FIG. 12B shows the degree of confidence in the direction of the auxiliary directions shown in FIG. 12A.

Then, the propagation region direction determining module 28 corrects the degree of confidence in the direction of the low confidence regions (referred to as "propagation regions" hereinafter) neighboring to the high confidence region by using the direction data determined within the high confidence region, determines the directions in each of the propagation regions through analyzing the corrected degree of confidence, and performs processing to expand the direction determined region (i.e., the high confidence region) thereby (FIG. 3: step S8/expansion processing).

Here, both that of the main directions extracted in step S2 and the auxiliary direction extracted in step S7 are employed as the candidate directions and the degree of confidence in the direction. That is, when the main direction represents the noise direction, propagation does not necessarily succeed. However, through evaluating the propagation possibility for the auxiliary direction as well in this case, it becomes possible to extract the ridge directions properly.

FIG. 13 shows the direction data propagation-expanded by the above-described expansion processing. Comparing FIG. 13 with FIG. 8, FIG. 13 shows that the more proper ridge directions are propagation-expanded (extracted).

The above-described expansion processing may be performed by using the technique disclosed in Japanese Unexamined Patent Publication 2007-65900, for example.

Then, the propagation region direction determining module 28 further checks whether or not it matches an ending condition of the expansion processing set in advance (FIG. 3: step S9).

As the ending condition, it is set to be when the expansion processing of the region cannot be executed or when the designated number of times set in advance has been completed.

When it does not match the ending condition (No: step S9) (FIG. 3: step S9/No), the processing for determining the direction within the low confidence region is performed by returning to step S4 by taking the propagation expansion region at the current point as the high confidence region. Thereby, the direction extraction module 12 recursively and repeatedly performs the processing of steps S4 to S9.

Further, the processing is performed by taking not the input image but the latest synthesized image as the target image within the high confidence region for the second time and thereafter. That is, the image from which the main direction components are eliminated in step S5 is employed instead of the input image, and the processing of steps S4 to S9 is performed.

FIG. 14A shows the result acquired by performing the propagation expansion processing recursively (second time), and FIG. 14B shows the result acquired by performing the propagation expansion processing recursively (third time).

FIG. 14B shows that the noise directions in the propagation region in FIG. 14A are eliminated based on the region where the ridge directions are properly extracted and that the ridge directions are corrected properly.

In the propagation region neighboring to the region where the ridge directions are extracted properly, the noise elimination is performed by using the direction data in which the ridge directions are extracted properly. Through performing the noise elimination recursively, it is expected that the low confidence region can be eliminated also in the image where the noise directions are enhanced.

Then, the ridge direction extraction unit 12 outputs the ridge direction data showing the extracted ridge directions (stored in the data storage module) to the ridge extraction module unit 13 (step S10).

The ridge extraction unit 13 performs processing for emphasizing the ridges in the fingerprint image based on the extracted ridge directions.

Thereby, the image in which the ridges are enhanced is expected to be clearer than the original image. This result is shown in FIG. 15.

Figure 15:
FIG. 15 is an explanatory image showing an example of a fingerprint image in which ridges are enhanced by a ridge extraction module of the minutia extraction device disclosed in FIG. 1.
Figure 16:
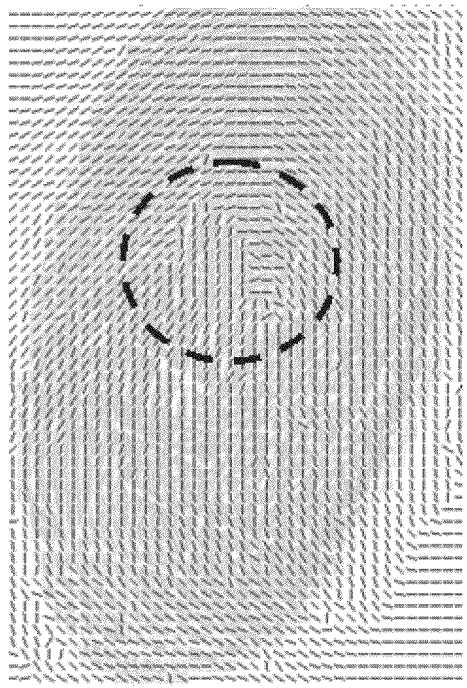
FIG. 16 is an explanatory image showing a result acquired by extracting ridge directions form a fingerprint image by using a related technique.
Figure 17:
FIG. 17 is an explanatory image showing a result acquired by extracting ridge directions form a fingerprint image by using a related technique.

That is, FIG. 15 shows the result acquired by performing the ridge emphasizing processing based on the fingerprint image of FIG. 4.

Comparing FIG. 15 with FIG. 4, the ridges are enhanced properly and the noise components of prominent wrinkles are suppressed (eased) in FIG. 15, so that the shapes and directions of the ridges are shown more clearly.

As described above, the exemplary embodiment makes it possible to extract the accurate ridge directions in the region where the fluctuation of the ridge directions is large (dispersion of the directions is large within a specific region), i.e., in the direction fluctuating region and the region where the degree of confidence in the direction is low (the low confidence region) through employing both the main direction extracted in step S2 and the auxiliary direction extracted in step S7 as the ridge directions for determining the ridge direction of the region where the ridge direction is indefinite.

Thereby, the accurate ridge directions can be extracted from the fingerprint image containing the noise. Thus, the ridge extraction unit 13 is capable of performing the processing for suppressing the noises actualized within the fingerprint image, actualizing the latent ridges within the fingerprint image, and extracting those.

Regarding the exemplary embodiment described above, the new technical contents thereof can be summarized as follows.

While a part of or a whole part of the embodiment can be summarized as follows as the new techniques, it is to be noted that the present invention is not necessarily limited only to the followings.

(Supplementary Note 1)

A ridge direction extraction device including a ridge direction extraction unit which performs extraction of a ridge direction showing a slope direction of the ridge by analyzing shape of the ridge within a fingerprint image, wherein the ridge direction extraction unit includes: a ridge direction determining module which determines the ridge direction as a main direction through evaluating a density difference between a target region set on the ridge and a surrounding region connected thereto, and calculates a degree of confidence in the direction showing accuracy of the main direction; a high confidence region setting module which extracts the target region where the degree of confidence in the direction is equal to or higher than a specific value and, sets a region connected to the region as a high confidence region; a low confidence region density conversion module which generates a density converted image through decreasing a density value within the low confidence region that is the region other than the high confidence region within the fingerprint image along the determined main direction; and a synthesized image generating module which generates a synthesized image in which the high confidence region in the fingerprint image and the low confidence region in the density converted image are synthesized, the ridge direction determining module includes an auxiliary direction determining function which determines a ridge direction in the synthesized image as an auxiliary direction and derives a degree of auxiliary direction confidence that shows accuracy of the auxiliary direction, and the ridge direction extraction unit further includes a high confidence region expanding module which calculates the degree of confidence in the direction based on the main direction in the fingerprint image and the auxiliary direction in the synthesized image, and corrects the ridge direction in the low confidence region connected to the high confidence region so as to increase the degree of confidence in the direction.

(Supplementary Note 2)

The ridge direction extraction device as depicted in Supplementary Note 1, wherein the high confidence region expanding module includes a direction correcting function which corrects the degree of confidence in the direction in the low confidence region based on the degree of confidence in the direction calculated based on the main direction and the auxiliary direction, and corrects the ridge direction determined in advance within the low confidence region based on the corrected degree of confidence in the direction.

(Supplementary Note 3)

The ridge direction extraction device as depicted in Supplementary Note 1, wherein the low confidence region density value conversion module includes a region direction smoothing function which eliminates a region whose dispersion of the main direction within the low confidence region is larger than a specific value, and smoothens the main direction in other regions within the low confidence region.

(Supplementary Note 4)

A ridge direction extraction method for performing extraction of a ridge direction that is a slope direction of the ridge, which is used in a ridge direction extraction device including a ridge direction extraction unit which analyzes shape of the ridge within a fingerprint image, and the method includes:

determining the ridge direction as a main direction through evaluating a density difference between a target region set on the ridge and a surrounding region connected thereto, and calculating a degree of confidence in the direction showing accuracy of the main direction;

extracting the target region where the degree of confidence in the direction is equal to or higher than a specific value, and setting a region connected to the region as a high confidence region;

generating a density converted image through decreasing a density value within the low confidence region that is the region other than the high confidence region within the fingerprint image along the determined main direction;

generating a synthesized image in which the high confidence region in the fingerprint image and the low confidence region in the density converted image are synthesized;

determining a ridge direction in the synthesized image as an auxiliary direction, and deriving a degree of auxiliary direction confidence that shows accuracy of the auxiliary direction; and calculating the degree of confidence in the direction based on the main direction in the fingerprint image and the auxiliary direction in the synthesized image, and correcting the ridge direction in the low confidence region connected to the high confidence region so as to increase the degree of confidence in the direction, wherein each of the operation steps are executed by the ridge direction extraction unit.

(Supplementary Note 5)

A ridge direction extraction program used in a ridge direction extraction device including a ridge direction extraction unit which analyzes shape of a ridge within a fingerprint image, and the program causes a computer provided to the ridge direction extraction unit to execute:

a ridge direction determining function which determines the ridge direction as a main direction through evaluating a density difference between a target region set on the ridge and a surrounding region connected thereto, and calculates a degree of confidence in the direction showing accuracy of the main direction;

a high confidence region setting function which extracts the target region where the degree of confidence in the direction is equal to or higher than a specific value, and sets a region connected to the region as a high confidence region;

a low confidence region density conversion function which generates a density converted image through decreasing a density value within the low confidence region that is the region other than the high confidence region within the fingerprint image along the determined main direction;

a synthesized image generating function which generates a synthesized image in which the high confidence region in the fingerprint image and the low confidence region in the density converted image are synthesized;

an auxiliary direction determining function which determines a ridge direction in the synthesized image as an auxiliary direction, and derives a degree of auxiliary direction confidence that shows accuracy of the auxiliary direction; and a high confidence region expanding function which calculates the degree of confidence in the direction based on the main direction in the fingerprint image and the auxiliary direction in the synthesized image, and corrects the ridge direction in the low confidence region connected to the high confidence region so as to increase the degree of confidence in the direction.

This application claims the Priority right based on Japanese Patent Application No. 2011-181080 filed on Aug. 23, 2011 and the disclosure thereof is hereby incorporated by reference in its entirety.

INDUSTRIAL APPLICABILITY

The present invention can be effectively applied to a system which sets the degree of confidence of the minutiae in a fingerprint image, a system which performs extraction of a plurality of ridge directions, and the like.

REFERENCE NUMERALS

10 Minutia extraction device
11 Image input unit
12 Ridge direction extraction unit
13 Ridge extraction unit
14 Minutia extraction unit
15 Minutia output unit
21 Data processing control module
22 Data storage module
23 Ridge direction determining module
24 High confidence initial region direction determining module (high confidence region setting function, high confidence region setting module)
25 Low confidence region direction determining module
26 Direction utilizing image emphasizing module (low confidence region density value converting function, low confidence region density value conversion module)
27 Auxiliary direction extracting image synthesizing module (synthesized image generating function, synthesized image generating module)
28 Propagation region direction determining module (high confidence region expanding function, high confidence region expanding module)

The invention claimed is:

1. A ridge direction extraction device, comprising a ridge direction extraction unit which performs extraction of a ridge direction showing a slope direction of the ridge by analyzing shape of the ridge within a fingerprint image, wherein
the ridge direction extraction unit comprises: a ridge direction determining module which determines the ridge direction as a main direction through evaluating a density difference between a target region set on the ridge and a surrounding region connected thereto, and calculates a degree of confidence in the direction showing accuracy of the main direction; a high confidence region setting module which extracts the target region where the degree of confidence in the direction is equal to or higher than a specific value and, sets a region connected to the region as a high confidence region; a low confidence region density conversion module which generates a density converted image through decreasing a density value within the low confidence region that is the region other than the high confidence region within the fingerprint image along the determined main direction; and a synthesized image generating module which generates a synthesized image in which the high confidence region in the fingerprint image and the low confidence region in the density converted image are synthesized,
the ridge direction determining module includes an auxiliary direction determining function which determines a ridge direction in the synthesized image as an auxiliary direction and derives a degree of auxiliary direction confidence that shows accuracy of the auxiliary direction, and
the ridge direction extraction unit further comprises a high confidence region expanding module which calculates the degree of confidence in the direction based on the main direction in the fingerprint image and the auxiliary direction in the synthesized image, and corrects the ridge direction in the low confidence region connected to the high confidence region so as to increase the degree of confidence in the direction.

2. The ridge direction extraction device as claimed in claim 1, wherein
the high confidence region expanding module includes a direction correcting function which corrects the degree of confidence in the direction in the low confidence region based on the degree of confidence in the direction calculated based on the main direction and the auxiliary direction, and corrects the ridge direction determined in advance within the low confidence region based on the corrected degree of confidence in the direction.

3. The ridge direction extraction device as claimed in claim 1, wherein
the low confidence region density value conversion module includes a region direction smoothing function which eliminates a region whose dispersion of the main direction within the low confidence region is larger than a specific value, and smoothens the main direction in other regions within the low confidence region.

4. A ridge direction extraction method for performing extraction of a ridge direction that is a slope direction of the ridge, which is used in a ridge direction extraction device comprising a ridge direction extraction unit which analyzes shape of the ridge within a fingerprint image, the method comprising:
determining the ridge direction as a main direction through evaluating a density difference between a target region set on the ridge and a surrounding region connected thereto, and calculating a degree of confidence in the direction showing accuracy of the main direction;
extracting the target region where the degree of confidence in the direction is equal to or higher than a specific value, and setting a region connected to the region as a high confidence region;
generating a density converted image through decreasing a density value within the low confidence region that is the region other than the high confidence region within the fingerprint image along the determined main direction;
generating a synthesized image in which the high confidence region in the fingerprint image and the low confidence region in the density converted image are synthesized;
determining a ridge direction in the synthesized image as an auxiliary direction, and deriving a degree of auxiliary direction confidence that shows accuracy of the auxiliary direction; and
calculating the degree of confidence in the direction based on the main direction in the fingerprint image and the auxiliary direction in the synthesized image, and correcting the ridge direction in the low confidence region connected to the high confidence region so as to increase the degree of confidence in the direction, wherein
each of operation steps are executed by the ridge direction extraction unit.

5. A non-transitory computer readable recording medium storing a ridge direction extraction program used in a ridge direction extraction device which comprises a ridge direction extraction unit which analyzes shape of a ridge within a fingerprint image, the program causing a computer provided to the ridge direction extraction unit to execute:

a ridge direction determining function which determines the ridge direction as a main direction through evaluating a density difference between a target region set on the ridge and a surrounding region connected thereto, and calculates a degree of confidence in the direction showing accuracy of the main direction;

a high confidence region setting function which extracts the target region where the degree of confidence in the direction is equal to or higher than a specific value, and sets a region connected to the region as a high confidence region;

a low confidence region density conversion function which generates a density converted image through decreasing a density value within the low confidence region that is the region other than the high confidence region within the fingerprint image along the determined main direction;

a synthesized image generating function which generates a synthesized image in which the high confidence region in the fingerprint image and the low confidence region in the density converted image are synthesized;

an auxiliary direction determining function which determines a ridge direction in the synthesized image as an auxiliary direction, and derives a degree of auxiliary direction confidence that shows accuracy of the auxiliary direction; and a high confidence region expanding function which calculates the degree of confidence in the direction based on the main direction in the fingerprint image and the auxiliary direction in the synthesized image, and corrects the ridge direction in the low confidence region connected to the high confidence region so as to increase the degree of confidence in the direction.

6. A ridge direction extraction device, comprising ridge direction extraction means for performing extraction of a ridge direction showing a slope direction of the ridge by analyzing shape of the ridge within a fingerprint image, wherein the ridge direction extraction means comprises: ridge direction determining means for determining the ridge direction as a main direction through evaluating a density difference between a target region set on the ridge and a surrounding region connected thereto, and calculating a degree of confidence in the direction showing accuracy of the main direction; high confidence region setting means for extracting the target region where the degree of confidence in the direction is equal to or higher than a specific value, and setting a region connected to the region as a high confidence region; low confidence region density conversion means for generating a density converted image through decreasing a density value within the low confidence region that is the region other than the high confidence region within the fingerprint image along the determined main direction; and synthesized image generating means for generating a synthesized image in which the high confidence region in the fingerprint image and the low confidence region in the density converted image are synthesized, the ridge direction determining module includes an auxiliary direction determining function which determines a ridge direction in the synthesized image as an auxiliary direction and derives a degree of auxiliary direction confidence that shows accuracy of the auxiliary direction, and the ridge direction extraction means further comprises high confidence region expanding means for calculating the degree of confidence in the direction based on the main direction in the fingerprint image and the auxiliary direction in the synthesized image, and correcting the ridge direction in the low confidence region connected to the high confidence region so as to increase the degree of confidence in the direction.

* * * * *